United States Patent [19]
Eastmond et al.

[11] Patent Number: 5,940,400
[45] Date of Patent: *Aug. 17, 1999

[54] METHOD, DEVICE, WIRELESS TRANSCEIVER AND COMPUTER FOR PROVIDING COLLISION DETECTION IN WIRELESS CARRIER SENSE MULTIPLE ACCESS SYSTEMS

[75] Inventors: Bruce C. Eastmond, Downers Grove; Rachid M. Alameh, Schaumburg; S. David Silk; Donald L. Linder, both of Palatine, all of Ill.

[73] Assignee: Motorola, Inc., Schaumburg, Ill.

[*] Notice: This patent is subject to a terminal disclaimer.

[21] Appl. No.: 08/743,685

[22] Filed: Nov. 6, 1996

[51] Int. Cl.$^6$ .................................................. H04L 12/413
[52] U.S. Cl. ........................................... 370/445; 370/338
[58] Field of Search .................................. 375/316, 324, 375/338, 344, 373; 455/209, 218, 222; 370/445, 414, 418, 437, 447, 461, 462, 465

[56] References Cited

U.S. PATENT DOCUMENTS

| | | |
|---|---|---|
| 5,162,791 | 11/1992 | Heegard . |
| 5,557,642 | 9/1996 | Williams ................................ 375/316 |
| 5,636,213 | 6/1997 | Eastmond et al. ....................... 370/445 |
| 5,715,281 | 2/1998 | Bly et al. ................................ 375/344 |
| 5,717,720 | 2/1998 | Jackson et al. ......................... 375/316 |

OTHER PUBLICATIONS

Wayne Tomasi, Electronic Communications Systems Fundamentals Through Advance, pp. 285–286, 1994.
Methods of Collision Detection in Fiber Optic CSMA/CD Networks, Jeffrey W. Reedy and J. Richard Jones, 1985 IEEE vol. SAC–3, No. 6 Nov. 1985.
Introduction of 10Mbps Infrared Wireless LAN, Oct. 1995, Victor Company of Japan, Ltd. NTT Data Communications Systems Corp., JVC/NTT Data.
National Semiconductor, DP83902A ST–NIC, Serial Network Interface Controller for Twisted Pair, Preliminary.

*Primary Examiner*—Ajit Patel
*Assistant Examiner*—Chi ho Andrew Lee
*Attorney, Agent, or Firm*—Darleen J. Stockley

[57] ABSTRACT

A method (600), device, wireless transceiver, computer and personal digital assistant (300, 400) provide collision presence detection in wireless intensity-modulated binary-coded data transceivers which is compatible with the collision detection employed in IEEE standard 10BASE-T Ethernet. A measurement of the degree of correlation which exists between the signal transmitted and the signal received provides a basis for efficient collision detection in CSMA systems.

7 Claims, 5 Drawing Sheets

METHOD, DEVICE, WIRELESS TRANSCEIVER AND COMPUTER FOR PROVIDING COLLISION DETECTION IN WIRELESS CARRIER SENSE MULTIPLE ACCESS SYSTEMS

FIELD OF THE INVENTION

The present invention relates to collision detection in carrier sense multiple access (CSMA) systems, and more particularly, to wireless embodiments of CSMA systems.

BACKGROUND OF THE INVENTION

Since 1990, the wired local area network defined by IEEE (The Institute of Electrical and Electronic Engineers, Inc.) standard 802.3i-1990 has rapidly emerged as the preeminent wired network standard for the office environment, where it has captured an estimated 70% of the market. This network is commonly referred to as 10BASE-T Ethernet, where 10BASE-T is an acronym which stands for 10 Mb/s, baseband transmission, and twisted-pair wiring. In addition to its widespread use in new installations, 10BASE-T Ethernet has in many cases supplanted earlier coaxial cable Ethernet and Token-Ring installations. Its advantages include the use of low-cost twisted pair cable and a star topology which facilitates network change management and fault location. Virtually all computers made today can be configured for Ethernet network access, and the majority of the computers used for business applications require such capability.

Each full-duplex 10BASE-T transceiver transmits data in a packet format to multiple stations on the network through a repeater. A maximum-length packet, which contains a data field of 1500 bytes, occupies the network for a time duration of approximately 1.2 ms. Transceivers are connected to the repeater by a set of transmit and receive twisted pairs. Each transmission is sent on a transmit pair to the repeater, where it is retransmitted on all the receiving pairs except for the originating one. Prior to attempting access to the repeater, each transceiver must determine that the network is idle, a process known as "carrier sensing". However, it is possible for another station on the network to begin transmitting between the time when the network is determined to be idle and the time when a transmission begins. The occurrence of simultaneous transmissions by two or more stations is called a collision, and it is inevitable that some collisions will occur in a carrier-sense, multiple access (CSMA) network such as Ethernet. If the occurrence of a collision can be detected, then colliding transmissions may be terminated at the inception of interference and retransmission can begin immediately. Without collision detection, the transmission medium is unusable for the duration of both damaged packets. Greater network throughput can be achieved by quickly aborting transmissions which are involved in collisions.

When a 10BASE-T network collision occurs, all non-transmitting stations receive garbled data, but each of the colliding stations receives the packet sent from the other transmitter. The occurrence of a collision is readily detected at each transmitting station by observing that a valid data signal is present on the receiving pair during a transmission. Valid data is determined by a combination of amplitude and timing measurements, which is sometimes referred to as a smart squelch. A smart squelch is included in serial network interface controllers, such as the National Semiconductor DP83902A, described in *Local Area Networks Databook,* 1993 Second Edition, ©National Semiconductor, 1993.

As soon as a collision is detected, the transmitting station terminates the packet with a 32-bit sequence, called "jam", which keeps the collision going long enough to ensure that the transmitting stations will be certain to detect its presence. Non-transmitting stations that have detected the jam sequence can clear their receiver data buffers since the packet is known to be damaged.

After the jam sequence has been transmitted, the stations involved in the collision wait random amounts of time and then attempt another transmission. If another collision occurs, then each station will persist in re-transmitting the data until either a successful transmission occurs or 16 unsuccessful attempts have been made, at which time the packet is discarded and the event is reported as an error. Re-transmissions are separated by a random transmission delay, determined by a truncated binary exponential backoff algorithm, to decrease the likelihood of subsequent collisions.

Prior to 1993, most stations connected to the 10BASE-T network were desktop personal computers; however, it is becoming increasingly common for portable computing units to be equipped with accessory slots conforming to the PCMCIA (Personal Computer Memory Card International Association) or PC Card standards which can accept credit card-sized 10BASE-T adapters. The users of portable computing units would receive significant benefit from a wireless means for extending the 10BASE-T network to establish communication ad hoc among collaborators on a common task, between desktop and portable computers, or with the wired network. Two 10BASE-T stations can form a "network" using a cross-connected cable in which the transmitter of the first station is connected to the receiver of the second station and vice versa. However, since n stations require $[n/2] \cdot [n-1]$ duplex twisted-pair cables, it is impracticable for a multi-station ad hoc network to be connected in this manner.

The environment of an ad hoc wireless 10BASE-T network is local, which minimizes the range and coverage requirements, as well as the likelihood of "hidden" stations. Thus, either IR optical or microwave radio frequencies are appropriate to convey the Ethernet signal by baseband on-off keyed modulation. Baseband on-off keyed modulation is spectrally efficient and simple to generate and detect. Signal emission in an IR optical receiver may employ one or more light-emitting diodes, such as the Stanley Electric Co., Ltd. DN304, or laser diodes; while signal emission in a microwave RF transmitter may employ a Gunn diode of the type used in law-enforcement speed detectors. Signal detection in an IR optical receiver may employ one or more photodiodes, while signal detection in a microwave RF receiver may employ a Schottky barrier diode. Information transmitted using IR optical signals is inherently private and resistant to interference since most building materials are opaque. In addition, the generation of IR optical signals does not require a license, and international spectrum regulation issues are avoided.

In the wired 10BASE-T environment, it is certain that the colliding signal originates from a second station. However, if the transmitting and receiving pairs of each station are not connected to the repeater but to a wireless emitter and receiver, respectively, then the wireless receiver will often respond to its own emitter due to reflection from nearby objects or surfaces. Under this condition, the 10BASE-T hardware and protocol will identify every transmission as a collision, the collision protocol will be continuously engaged, and the network will become inoperative. Thus, standard 10BASE-T Ethernet hardware and protocol is inadequate when the wire transmission medium is replaced with a wireless transmission medium.

Collision detection is readily accomplished in prior-art Ethernet systems and star-connected fiber systems determine collisions by means of amplitude detection, since signal attenuation is minimal and all signals have substantially the same amplitude. In 10BASE-2 and 10BASE-5 Ethernet, collisions are sensed by observing a signal level on the coaxial cable which is in excess of that generated by the local transmitter. In 10BASE-T twisted-pair Ethernet and star-connected fiber systems, transmission and reception occur on separate connections, which makes collision sensing even easier to accomplish.

Violations of the coding rules for binary data formats such as Manchester may be detected and used to identify the presence of collisions as described by C. Haegard in U.S. Pat. No. 5,162,791, "Collision Detection Using Code Rule Violations of the Manchester Code", issued Nov. 10, 1992. However, coding rule violations will only occur when the reflected signal from the local transmitter and the colliding signal are commensurate in amplitude. If the colliding signal is strong enough to capture the receiver, which may occur in a collaborative wireless environment, then coding rule violations will not occur.

As known in the prior art, collisions may be sensed by examining the receiver for valid data during a pause in each transmission. If valid data is present, then the transmission is aborted. Since this approach requires modifications to the Ethernet packet structure and the Ethernet transceiver, it has the disadvantage of not being compatible with a standard Ethernet system.

Collisions may also be sensed by a bit-by-bit comparison of a packet being received to the packet being transmitted. Implementation of this method, as described by J. W. Reedy, et al. in "Methods of Collision Detection in Fiber Optic CSMA/CD Networks", *IEEE Journal on Selected Areas in Communication*, Vol. SAC-3, No. 6, November 1985, results in a more complex MAU (media attachment unit), since data and timing recovery circuits and data buffers must be employed. In fact, these circuits duplicate similar circuits in the attached station.

The prior art in wireless LAN systems includes a variety of IR, or infrared, and RF, or radio frequency, systems. Prior-art IR systems lack the bandwidth, optics or protocol to implement an ad hoc collaborative network of portable computers. Prior art RF systems are either limited by spectrum availability to a data rate less than 10 Mbit/s, or designed for stationary mounting and ac-powered operation.

Since electromagnetic energy is subject to the free-space $R^{-2}$ propagation law and may also be scattered, signal amplitude is not constant in wireless systems and the simple, relatively ideal collision detection used in cable or wire systems cannot be employed. Perforce, there are few examples of collision detection which exist in the prior art.

In the prior-art "Vipslan-10/Astrowink-E" infrared wireless Ethernet LAN developed by JVC/NTT Data, the local transmitter signal is cancelled so that a colliding signal may be detected by the Ethernet decoder. However, this approach requires a significant increase in the wireless transceiver complexity, cost, and current drain.

Accordingly, there is a need for a method and device for providing collision detection in wireless carrier sense multiple access systems for ad hoc collaborative networking which is compatible with standard Ethernet protocol and transceivers, and which provides for low complexity, cost, and current drain.

DETAILED DESCRIPTION OF A PREFERRED EMBODIMENT

Figure 1:
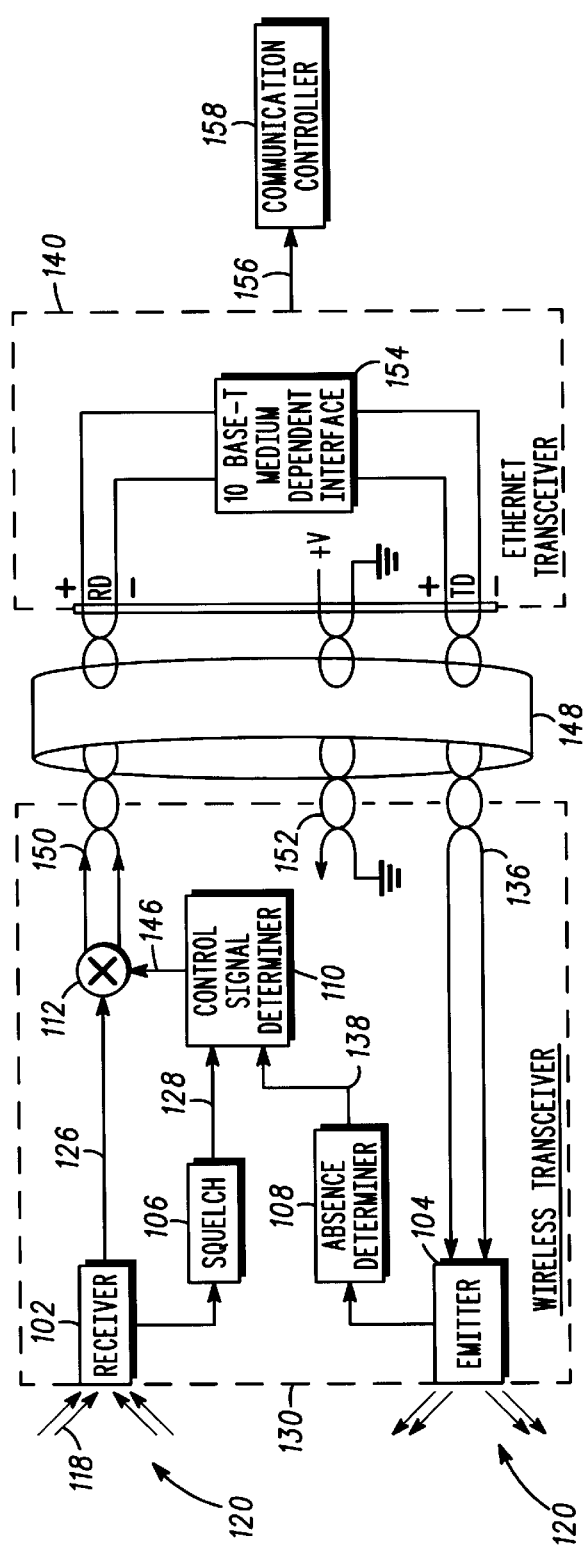
FIG. 1 is a block diagram of a wireless CSMA communication system in accordance with the prior art.

FIG. 1, numeral 100, a block diagram of a wireless CSMA communication system using Ethernet in accordance with the prior art as described in Eastmond, et al., "Method, Transceiver, and System for Providing Wireless Communication Compatible With 10BASE-T Ethernet", U.S. patent application Ser. No. 08/365,615, filed Dec. 28, 1994, which is hereby incorporated by reference. The system includes a wireless transceiver (130), an Ethernet transceiver (140), and a communication controller (158).

The wireless transceiver (130) includes a receiver (102), an emitter (104), a squelch (106), an absence determiner (308), a control signal determiner (110), and a squelch gate (112).

The receiver (102) receives a first wireless signal (118) modulated according to binary-coded data packets, which originates from a point external to the transceiver, and may receive a second wireless signal (120) which originates from the emitter (104). The presence of second wireless signal (120) at the receiver (102) depends upon the presence of reflective materials in proximity to wireless transceiver (130). The receiver produces a binary output signal (126), with the transition between levels corresponding to a first signal (118) or a second signal (120) if present, or to the receiver (102) noise if neither the first nor the second signal is present.

The squelch (106), operably coupled to the receiver (102), responds to the presence of first wireless signal (118) or second wireless signal (120) by producing an indication of received signal presence (128).

The emitter (104) emits a second wireless signal (120) in response to the transmitted signal (136). If the transmitted signal (136) is an Ethernet data signal, then it consists of data packets which include a plurality of Manchester-encoded bits transmitted at a 10 Mbit/s rate.

The absence determiner (108), operably coupled to receive the transmitted signal (136), produces, by a logic high state, an indication of second wireless signal absence (138).

The control signal determiner (110) is coupled to the absence determiner (108) and to the squelch (106) for producing a control signal (146) based on the simultaneous occurrence of both the signal presence (128) and second signal absence (138). The control signal determiner (110) may include a two-input AND gate; however, other equivalent combinations of standard logic elements may be chosen.

The squelch gate (112), coupled to binary output signal (126) and controlled by control signal (146), operates so that the gated signal (150) includes only the first signal (118). Both the receiver noise and the second signal (120) are blocked from the gated signal (150).

The Ethernet transceiver (140), known in the art, includes a 10BASE-T Medium Dependent Interface (154) for communicating with a wireless transceiver (130) using a twisted-pair cable (148) connected to the standard interface connector (144). Power and ground connections (152) may also be included in the twisted-pair cable (148). The 10BASE-T Medium Dependent Interface (154) is operably coupled to the communication controller (158) through the interface (156). The communication controller (158) may be a personal computer, a personal digital assistant, an Ethernet bridge, as is known in the art, or another communication device for generating and responding to data using the Ethernet protocol. Interface (156) may be a PCMCIA or PC Card standard interface as is known in the art.

Figure 2:
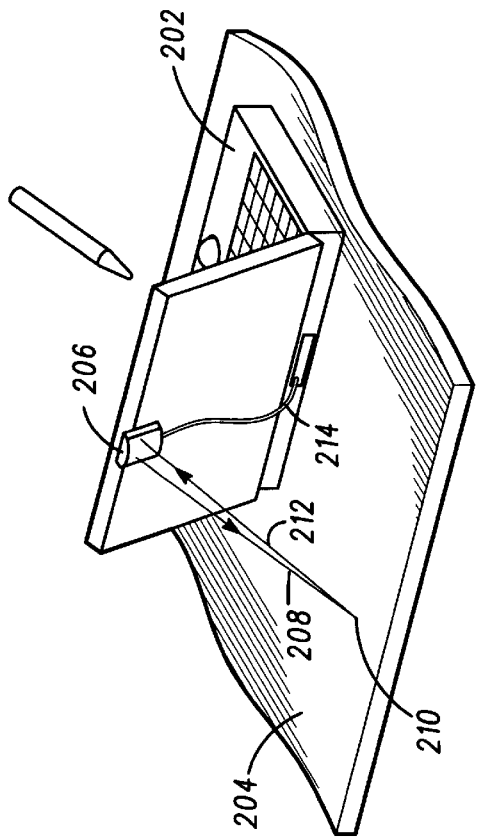
FIG. 2 is a graphic representation of local reflection of a wireless signal as is known in the art.

FIG. 2, numeral 200, is a graphic representation of a local reflection of a wireless signal as is known in the art. A wireless transceiver (206), which is operably connected by twisted-pair cable (214) to communication controller (202) emits an incident wireless signal (208). A portion of the incident wireless signal (208) is reflected by a surface (204) at a point (210) and returned to the wireless transceiver (206) as a reflected wireless signal (212).

Figure 3:
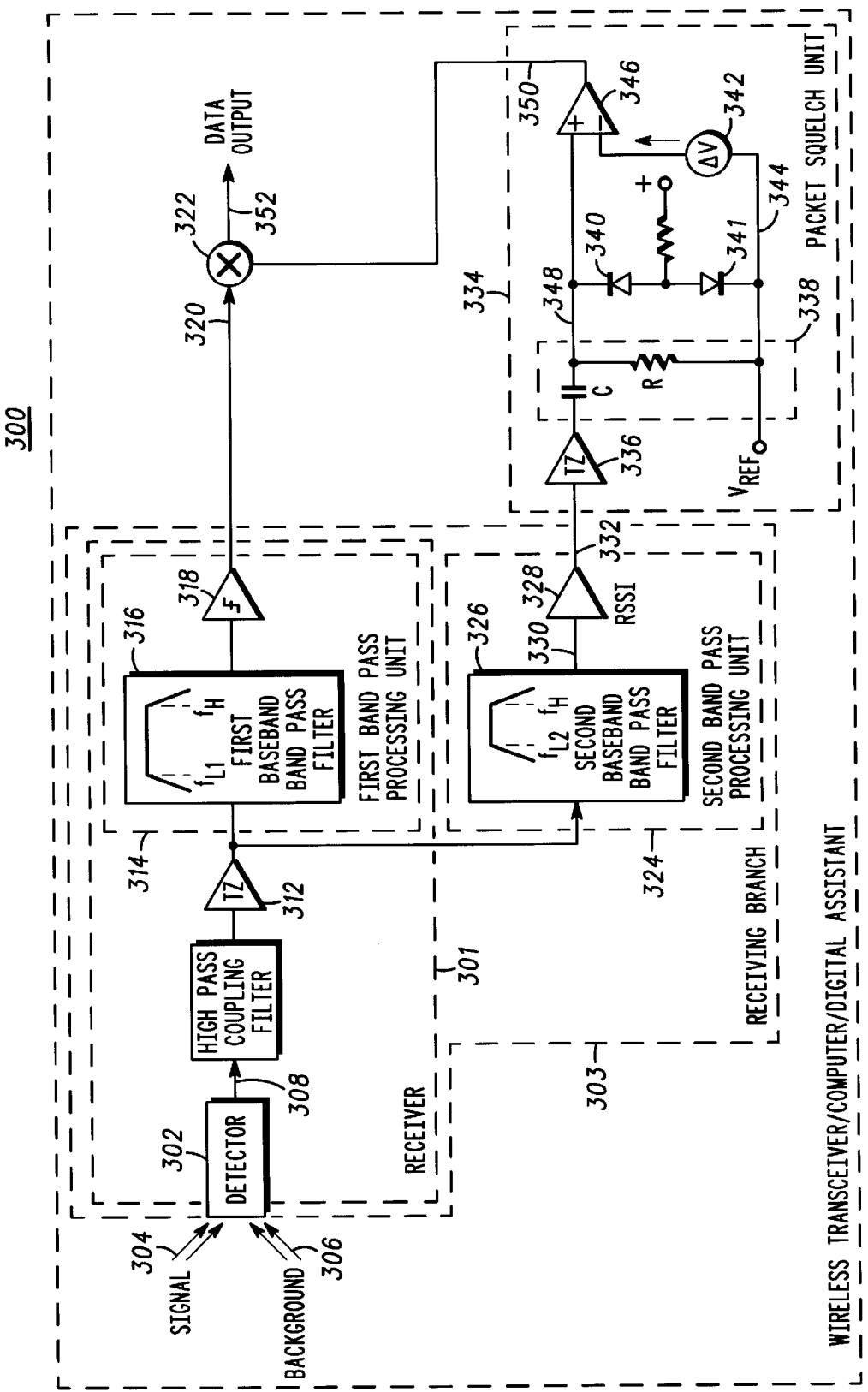
FIG. 3 shows a block diagram of a receiving system for binary-coded wireless data packets for use with the present invention.

FIG. 3, numeral 300, is a block diagram of a receiving system for binary-coded wireless data packets for use with the present invention that includes a receiver (301), a squelch switch (322), a second band-pass processing unit (324), and a packet squelch unit (334). A receiving branch (303) includes the receiver (301) and the second band-pass processing unit (324).

In the receiver (301), an electromagnetic signal (304), modulated according to binary-coded data packets, and background electromagnetic radiation (306) are converted to a current (308) in a detector (302). Low-frequency components of current (308) are removed by a high-pass coupling network (310) prior to current-to-voltage conversion in a first transimpedance amplifier (312).

In a first band-pass processing unit (314), the output of the first transimpedance amplifier (312) is coupled to a limiter (318) through a first baseband band-pass filter (316). The bandwidth of the first baseband band-pass filter (316), as defined by low-frequency cutoff $f_{L1}$ and high-frequency cutoff $f_H$, is chosen to remove noise generated in the detector (302) by background electromagnetic radiation (306), and thermal noise generated in first transimpedance amplifier (312), without introducing appreciable distortion or intersymbol interference to the binary coded data signal. For binary-coded Ethernet signals, appropriate values for $f_{L1}$ and $f_H$ are 500 kHz and 15 MHz, respectively. The gain of limiter (318) is sufficiently large so that a binary signal (320) is produced by thermal noise generated in the first transimpedance amplifier (312), or noise generated in the detector (302) when an electromagnetic signal (304) is not present. A squelch switch (322) blocks the the binary signal (320) from data output (352) when binary-coded data signals are not present.

In the second band-pass processing unit (324), the output of the first transimpedance amplifier (312) is coupled to a received signal strength indicator, RSSI (328), through the second baseband band-pass filter (326). An example of a component suitable for use as RSSI (328) is the Motorola MC13158 wideband FM IF subsystem. Using such a component, the RSSI output (332) is substantially proportional to the logarithm of the second baseband band-pass filter output signal (330). The bandwidth of the second baseband band-pass filter (326) is defined by the low-frequency cutoff $f_{L2}$ and the high-frequency cutoff $f_H$. The low-frequency cutoff $f_{L2}$ of the second baseband band-pass filter (326) is made greater than the low-frequency cutoff $f_{L1}$ of the first baseband band-pass filter (316) in order to achieve reduced recovery time in response to intensity modulated binary-coded data packets. By increasing $f_{L2}$ of the second baseband bandpass filter (326) from 500 kHz to 5 MHz, the recovery time constant for an Ethernet signal having a packet envelope peak amplitude 60 dB above the squelch threshold is reduced by a factor of 10 to 220 ns, or 2.2 bits. Squelch sensitivity is maintained, since little signal energy is lost when $f_{L2}$ is increased because Manchester-encoded Ethernet signals have a broad spectral peak near 5 MHz.

In the packet squelch unit (334), the RSSI output (332) is operably coupled to the input (348) of the comparator (346) through the tandem combination of the second transimpedance amplifier (336) and the R-C (i.e., resistor-capacitor) high-pass coupling network (338). When the RSSI output (332) is generated by a current source, the second transimpedance amplifier (336) may be advantageously employed as a low-impedance current sink which minimizes the RSSI response time associated with source parasitic capacitance. The R-C high-pass coupling network (338), referenced to voltage reference (344), blocks the slowly-varying changes in RSSI output (332) which may be associated with variations in the level of background electromagnetic radiation (306). The time constant of the R-C high-pass network (338) is selected to be significantly greater than the longest data packet duration present in electromagnetic signal (304). A clamping diode (340), and a forward-biased compensating diode (341) maintain the base line of data packet signals at input (348) at a level determined by voltage reference (344). When the amplitude of a data packet signal at input (348) exceeds the predetermined squelch threshold voltage AV (342), then the comparator (346) provides a control signal (350) to the squelch switch (322) so that the binary signal (320) is present at the data output (352). The selection of the predetermined squelch threshold voltage AV (342) is a compromise between the threshold sensitivity and the falsing rate.

Thus, the device for indicating received signal strength and presence for intensity modulated binary-coded data packets with reduced recovery time in a packet data receiving system, includes: a receiver (301) for binary coded wireless data packets having a first band-pass processing unit (314), for receiving modulated electromagnetic signals and converting the modulated electromagnetic signals to binary data signals; and a second band-pass processing unit (324) for providing a logarithmic received signal strength indicator signal, RSSI, using a low-frequency cutoff $f_{L2}$ greater than a low-frequency cutoff $f_{L1}$ of the first second band-pass processing unit. The device may further include a packet squelch unit (334), coupled to the second band-pass processing unit (324), for using the RSSI signal to provide a data squelch signal.

The receiver (301) includes a detector of electromagnetic energy that is typically a photodiode or a Gunn diode.

The receiver (301), the second band-pass processing unit (324), and the packet squelch unit (334) may be implemented in an application specific integrated circuit or a digital signal processor or a combination of both.

Figure 4:
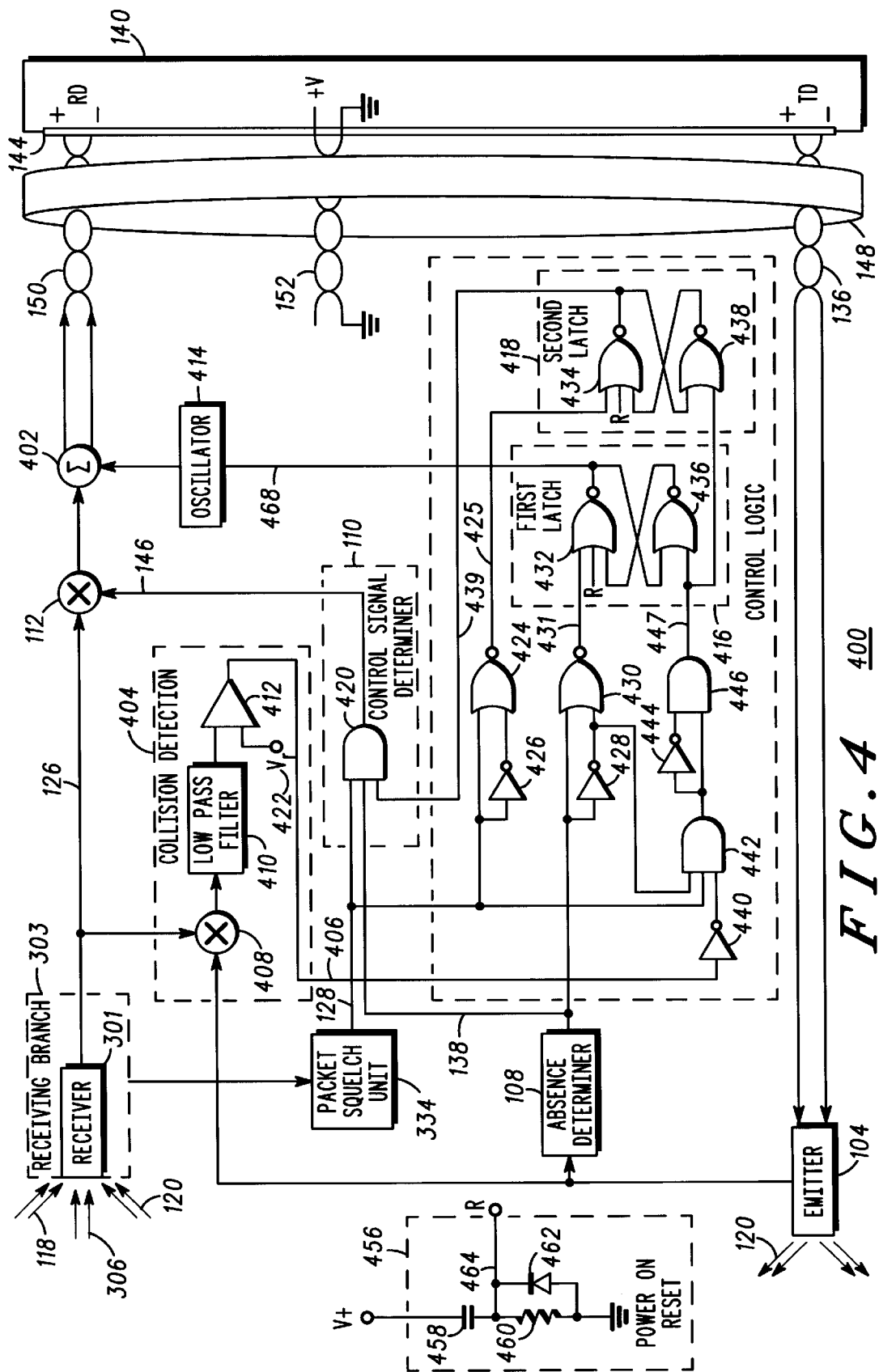
FIG. 4 is a block diagram of one embodiment of a device for providing collision detection in wireless CSMA systems in accordance with the present invention.
Figure 5:
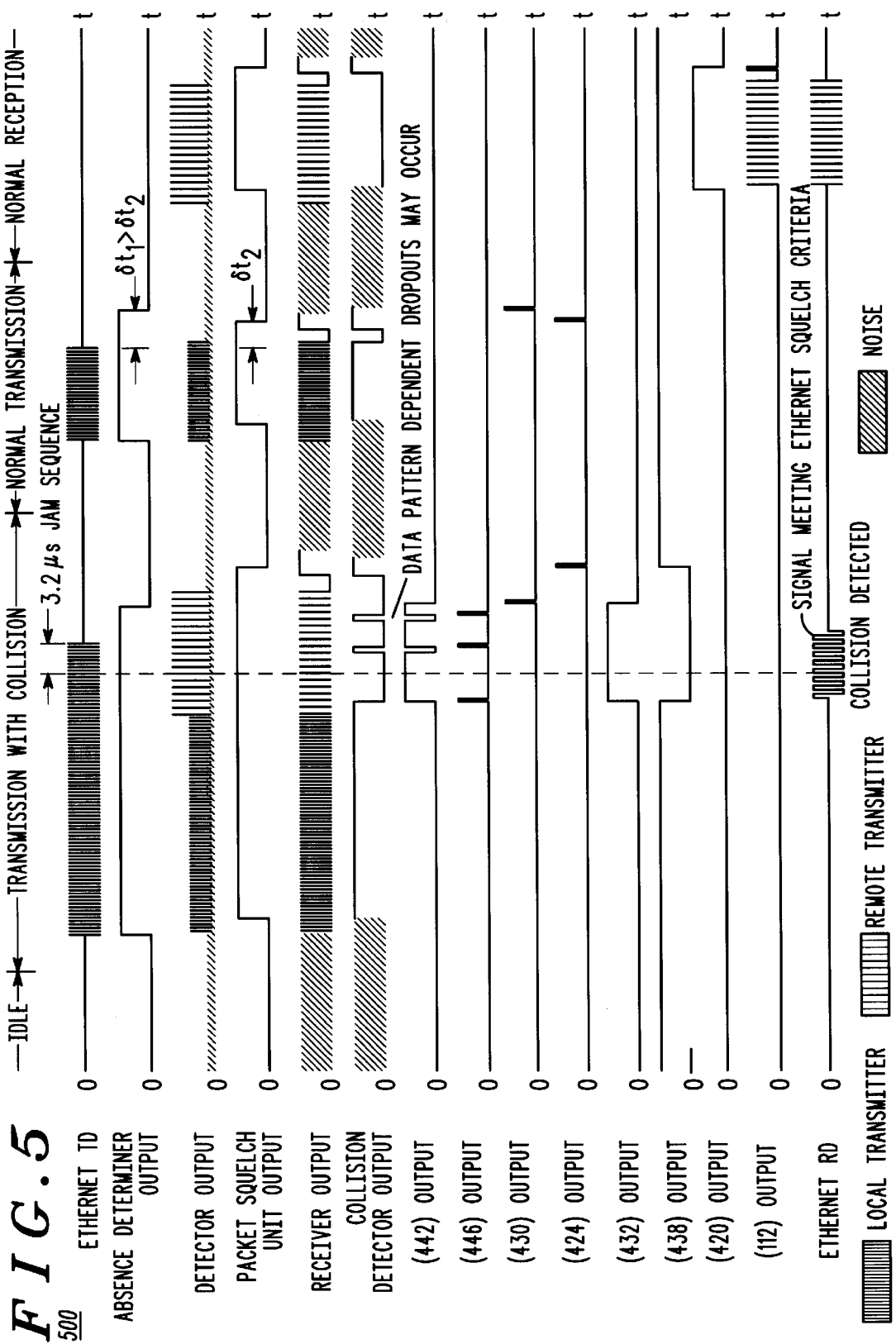
FIG. 5 illustrates a timing diagram relating to FIG. 4.

FIG. 4, numeral 400, is a block diagram of one embodiment of a device for providing collision detection in wireless CSMA systems in accordance with the present invention. FIG. 5, numeral 500, illustrates a timing diagram with respect to FIG. 4.

In receiving branch (303), receiver (301) receives a first wireless signal (118) modulated according to binary-coded data packets, which originates from a point external to the transceiver. The receiver (301) may also receive a second wireless signal (120), modulated according to binary-coded data packets and originating from the emitter (104), and background electromagnetic radiation (306). The presence of the second wireless signal (120) at the receiver (301) depends upon the presence of reflective materials in the environment. The receiver (301) produces a binary output signal (126), with the transition between levels corresponding to the largest amplitude among the first signal (118), the second signal (120), the background electromagnetic radiation (306), and the receiver (301) noise.

The squelch gate (112), coupled to binary output signal (126) and controlled by control signal (146), operates so that gated signal (150) includes only the first wireless signal (118). Receiver (301) noise, second wireless signal (120), and background electromagnetic radiation (306) are blocked from gated signal (150). Gated signal (150) is coupled by twisted-pair cable (148) to Ethernet transceiver (140) using standard interface connector (144). Power and ground connections (152) may also be included in twisted-pair cable (148).

A packet squelch unit (334), operably coupled to the receiver (301), responds to the presence of the first wireless signal (118) or the second wireless signal (120) by producing an indication of received signal presence (128).

The emitter (104) emits the second wireless signal (120) in response to a transmitted signal (136). If the transmitted signal (136) is an Ethernet data signal, then it consists of data packets which include a plurality of Manchester-encoded bits transmitted at a10 Mbit/s rate.

The absence determiner (108), operably coupled to the transmitted signal (136), produces, by a logic high state, an indication of second wireless signal absence (138).

The control signal determiner (110) is coupled to the absence determiner (108) and to the packet squelch unit (334) for producing a control signal (146) based on the simultaneous occurrence of both signal presence (128) and the second wireless signal absence (138). The control signal determiner (110) may include an AND gate (420); however, a combination of other equivalent standard logic elements may also be chosen.

In the collision detector (404), the binary output signal (126) and the transmitted signal (136) are correlated by the tandem processes of multiplication in a multiplier (408) and low-pass filtering in a low-pass filter (410). The multiplier (408) may be advantageously incorporated into an integrated circuit which includes receiver functions, such as the Motorola MC13158. The output from the low-pass filter (410) is compared with a predetermined threshold, $V_r$ (422) in the comparator (412). Comparator output (406) produces, by a logic high state, an indication of correlation between binary output signal (126) and transmitted signal (136). Such correlation will exist when reflective materials are present in the environment of the transceiver. The level of the second wireless signal (120) produced at the receiver (301) by emitter (104) determines the maximum range at which a colliding transmission can be detected since the binary output signal (126) and the transmitted signal (136) are uncorrelated when the level of the first wireless signal (118) exceeds the level of the second wireless signal (120) and captures receiver (301).

The logic OR gate (424) and the invertor (426) form a gate-delay pulse generator which produces at (425) a logic high pulse that signifies the end of a packet as indicated by the packet squelch unit (334).

The logic OR gate (430) and the invertor (428) form a gate-delay pulse generator which produces at (431) a logic high pulse that signifies the end of transmitted signal (136) as indicated by the absence determiner (108).

The logic AND gate (442) and the invertor (440) produce a logic high state when all of the following conditions are true: the presence of a transmitted signal (136) is indicated at (138) by the absence determiner (108); the presence of a received signal is indicated at (128) by the packet squelch unit (334); and the binary output signal (126) and the transmitted signal (136) are uncorrelated. The logic AND gate (446) and the invertor (444) form a gate-delay pulse generator which produces at (447) a logic high pulse that signifies the inception of collision detection.

The logic high pulse at (447) sets first latch (416), includes logic OR gates (432, 436), so that a logic high state is present at (468). The logic high state at (468) activates the oscillator (414) for providing a periodic valid data signal at the summing junction (402). The logic high pulse at (447) also sets the second latch (418), includes logic OR gates (434, 438), so that a logic low state is present at (439). The logic low state at (439) inhibits operation of the squelch gate (112). The first latch (416) is reset by the logic high pulse at (431) when the absence determiner (108) indicates that the transmitted signal has ended. The second latch (418) is reset by the logic high pulse at (425) when the packet squelch unit (334) indicates at (128) that the signal is no longer present.

Capacitor (458), resistor (460) and diode (462) form a power-on reset circuit to define the state of the first latch (416) and the second latch (418) in a manner which is known in the art.

Where selected, the device of the present invention may be included within a wireless transceiver, a computer or a personal digital assistant. The device typically includes: a receiver (301) having a first band-pass processing unit (314), arranged to receive a transmitted signal, for providing an output signal in response to the transmitted signal; a second band-pass processing unit (324), coupled to the receiver (301), for providing a received signal strength indicator signal; a packet squelch unit (334), coupled to the second band-pass processing unit (324), for providing a control signal to a squelch switch (322) in accordance with whether a predetermined correlation exists between the signal transmitted and a signal received; and the squelch switch (322), coupled to the receiver (301) and the packet squelch unit (334), for blocking the output signal when the control signal indicates that the predetermined correlation exists between the transmitted signal and the signal received.

Figure 6:
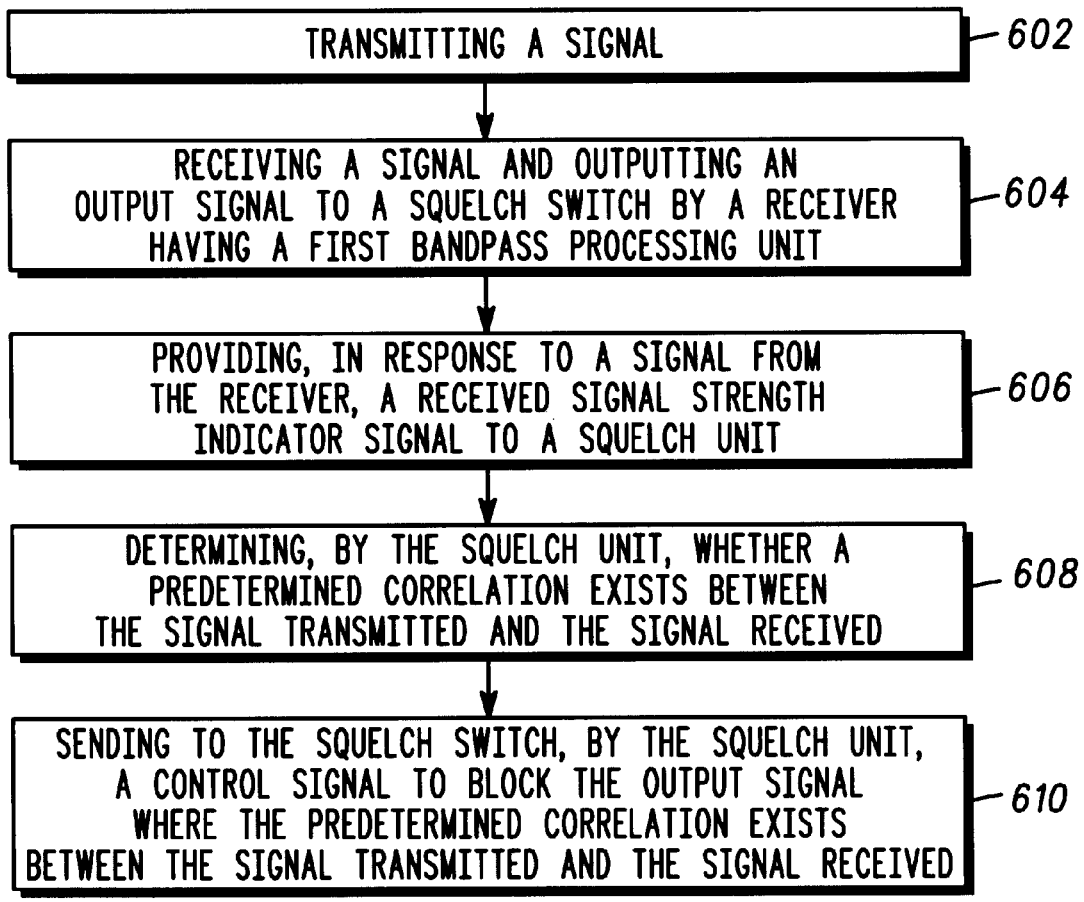
FIG. 6 is a flow chart of steps of one embodiment of a method in accordance with the present invention.

FIG. 6, numeral 600, is a flow chart of steps of one embodiment of a method in accordance with the present invention. The steps of the method include: (A) transmitting (602) a signal;

(B) receiving a signal and outputting (604) an output signal to a squelch switch by a receiver having a first band-pass processing unit; (C) providing (606), in reponse to a signal from the receiver, a received signal strength indicator signal to a squelch unit; (D) determining (608), by the squelch unit, whether a predetermined correlation exists between the signal transmitted and the signal received; and (E) sending (610) to the squelch switch, by the squelch unit, a control signal to block the output signal where the predetermined correlation exists between the signal transmitted and the signal received.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A device for providing collision detection in a wireless carrier sense multiple access system, comprising:
    A) a detector, for detecting received electromagnetic signals;
    B) a receiver, coupled to the detector, for receiving electromagnetic signals from the detector and converting the electromagnetic signals to binary data signals;
    C) a collision detector, coupled to the receiver and to receive an emitter control signal, for multiplying and filtering the binary data signals from the receiver and the emitter control signal and then comparing filtered multiplied signals to a predetermined threshold;
    D) a signal presence indicator, coupled to the receiver, for indicating a presence of a detected signal;
    E) a delay unit, coupled to receive the emitter control signal, for delaying the emitter control signal to correlate envelope correlation between a received and transmitted signal;
    F) a packet envelope detector, coupled to the delay unit, for detecting a packet envelope;
    G) the emitter, for receiving an emitter control signal and transmitting electromagnetic signals;
    H) a control logic unit, coupled to the packet envelope detector, the signal presence indicator and the collision detector, for controlling a squelch gate and for controlling an oscillator that generates a valid Ethernet signal;
    I) the squelch gate, coupled to the collision detector and the control logic unit, for muting receiver output when one of: the emitter is active and a signal is absent; and
    J) an oscillator unit, coupled to the squelch gate and the control unit, for providing the valid Ethernet signal when collision occurs,
    wherein the oscillator unit includes:
        K) an oscillator, coupled to the control logic unit, for providing a waveform when collision occurs; and
        L) a summer, coupled to the oscillator and the squelch gate, for combining the waveform and an output of the squelch gate to provide the valid Ethernet signal.

2. The device of claim 1 wherein the collision detector is implemented utilizing an FM receiver intermediate frequency integrated circuit.

3. A method for providing collision detection in wireless carrier sense multiple access systems, comprising:
    A) detecting and receiving electromagnetic signals and converting the electromagnetic signals to binary data signals;
    B) using a collision detector for multiplying and filtering the binary data signals from a receiver and an emitter control signal and then comparing filtered multiplied signals to a predetermined threshold;
    C) using a signal presence indicator for indicating a presence of a detected signal in the receiver;
    D) delaying an emitter control signal to correlate envelope correlation between a received and transmitted signal;
    E) detecting a packet envelope of the emitter control signal;
    F) receiving an emitter control signal and transmitting electromagnetic signals from an emitter;
    G) controlling a squelch gate and for controlling an oscillator that generates a valid Ethernet signal, wherein controlling the oscillator includes the steps of:
        G1) providing a waveform when collision occurs; and
        G2) combining the waveform and an output of the squelch gate to provide the valid Ethernet signal;
    H) muting receiver output when one of: the emitter is active and a signal is absent; and
    I) providing the valid Ethernet signal when collision occurs.

4. The method of claim 3 including implementing the collision detector utilizing an FM receiver intermediate frequency integrated circuit.

5. A computer/personal digital assistant having an interface coupled to an Ethernet transceiver that is coupled to a wireless transceiver, for providing collision detection in a wireless carrier sense multiple access system, wherein the wireless transceiver comprises:
    a receiver having a first band-pass processing unit, arranged to receive a transmitted signal, for providing an output signal in response to the transmitted signal;
    a second band-pass processing unit, coupled to the receiver, for providing a received signal strength indicator signal to a packet squelch unit;
    the packet squelch unit, coupled to the second band-pass processing unit, for providing a control signal to a squelch switch in accordance with whether a predetermined correlation exists between the signal transmitted and a signal received; and
    the squelch switch, coupled to the receiver and the packet squelch unit, for blocking the output signal when the control signal indicates that the predetermined correlation exists between the transmitted signal and the signal received,
    wherein the packet squelch unit mutes receiver output when one of: the emitter is active and a signal is absent and is coupled to an oscillator unit that provides a waveform when collision occurs and combines the waveform and an output of the squelch switch to provide the valid Ethernet signal.

6. A wireless transceiver having a device for providing collision detection in a wireless carrier sense multiple access system, the device comprising:
    a receiver having a first band-pass processing unit, arranged to receive a transmitted signal, for providing an output signal in response to the transmitted signal; and
    a second band-pass processing unit, coupled to the receiver, for providing a received signal strength indicator signal to a packet squelch unit;
    the packet squelch unit, coupled to the second band-pass processing unit, for providing control signal to a squelch switch in accordance with whether a predetermined correlation exists between the signal transmitted and a signal received; and
    the squelch switch, coupled to the receiver and the packet squelch unit, for blocking the output signal when the control signal indicates that the predetermined correlation exists between the transmitted signal and the signal received, wherein receiver output is muted when one of: an emitter is active and a signal is absent and an oscillator unit provides a waveform when collision occurs and combines the waveform and an output of the squelch switch to provide a valid Ethernet signal.

7. A method for providing collision detection in a wireless carrier sense multiple access system, comprising the steps of:

transmitting a signal;

receiving a signal and outputting an output signal to a squelch switch by a receiver having a first band-pass processing unit; and providing, in response to a signal from the receiver, a received signal strength indicator signal to a squelch unit; and determining, by the squelch unit, whether a predetermined correlation exists between the signal transmitted and the signal received; and sending to the squelch switch, by the squelch unit, a control signal to block the output signal where the predetermined correlation exists between the signal transmitted and the signal received, wherein receiver output is muted when one of: an emitter is active and a signal is absent and an oscillator unit provides a waveform when collision occurs and combines the waveform and an output of the squelch switch to provide a valid Ethernet signal.

* * * * *